(12) United States Patent
Huber

(10) Patent No.: US 7,072,859 B1
(45) Date of Patent: Jul. 4, 2006

(54) ELECTRONIC COMMERCE CHECKOUT SYSTEM

(75) Inventor: Paul Huber, Phoenix, MD (US)

(73) Assignee: Black & Decker Inc., Newark, DE (US)

( * ) Notice: Subject to any disclaimer, the term of this patent is extended or adjusted under 35 U.S.C. 154(b) by 701 days.

(21) Appl. No.: 09/933,244

(22) Filed: Aug. 20, 2001

Related U.S. Application Data

(60) Provisional application No. 60/226,766, filed on Aug. 21, 2000.

(51) Int. Cl.
*G06F 17/60* (2006.01)

(52) U.S. Cl. .......................................... 705/26; 705/27

(58) Field of Classification Search .................. 705/26, 705/27

See application file for complete search history.

(56) References Cited

U.S. PATENT DOCUMENTS

| | | | | |
|---|---|---|---|---|
| 5,966,697 A * | 10/1999 | Fergerson et al. | ............ | 705/26 |
| 5,970,472 A * | 10/1999 | Allsop et al. | ................... | 705/26 |
| 6,263,317 B1 * | 7/2001 | Sharp et al. | .................. | 705/26 |
| 6,925,444 B1 * | 8/2005 | McCollom et al. | ........... | 705/14 |
| 2003/0093321 A1 * | 5/2003 | Bodmer et al. | ............... | 705/26 |

FOREIGN PATENT DOCUMENTS

WO      WO 01/33453 A1 * 10/2001

OTHER PUBLICATIONS

3Com1, 3Com paves the way to resellers, Infoworld Sep. 21, 1998, vol. 20, Issue 38, p. 59, 2 pages.*
3Com2, Ptent filed for ddgml, ewonders' educated e-commerce tool, Businesswire, Aug. 2, 1999, 2 pages.*
PR Newswire, MSN announces new customized version of internet explorer 5, Free download available at MSN.Com. Mar. 18, 1999, 3 pages.*
www.maytag.com (certain web pages regarding purchasing Maytag products from an Online Partner Store printed Aug. 18, 2001).

* cited by examiner

*Primary Examiner*—Mark Fadok
*Assistant Examiner*—Lowuan Ellis
(74) *Attorney, Agent, or Firm*—Harness, Dickey & Pierce, P.L.C.

(57) ABSTRACT

The customer selects products from the manufacturer's web site and places them into an electronic shopping cart administered by the manufacturer's site. Instead of proceeding through a checkout line at the manufacturer's site, the system captures all pertinent information regarding the customer's selections and forwards them to a retail site designated by the manufacturer or of the customer's choosing. The transfer of shopping cart information is effected so that the customer finds himself or herself directly in the checkout line of the designated retailer, thereby eliminating the need to fill a shopping cart through product selection at the retail site.

18 Claims, 7 Drawing Sheets

ELECTRONIC COMMERCE CHECKOUT SYSTEM

CROSS-REFERENCE TO RELATED APPLICATIONS

This application claims the benefit of U.S. Provisional Application No. 60/226,766, filed Aug. 21, 2000.

FIELD OF THE INVENTION

The present invention relates generally to computer network-based electronic commerce, and more particularly, to an Internet shopping and checkout system in which shoppers identify goods and services from a manufacturer's web site, place selected products in an electronic shopping cart at the manufacturer's site, and then jump directly to the checkout line of a retailer's site of the customer's choice to purchase the products in the shopping cart.

BACKGROUND OF THE INVENTION

Retail shopping web sites are popular with consumers because they can shop at home from the convenience of their home computer. Retail web sites give the consumer a lot of power because the consumer can search vast databases of offered goods and services, comparing prices, features and customer reviews, and then purchase selected products in a simple on-line check-out transaction. Manufacturers recognize that web sites featuring their products can be a valuable marketing tool. Consumers interested in a manufacturer's products will often visit the manufacturer's web site to obtain information about products of interest. Thus, manufacturer web sites represent a valuable opportunity to sell products.

Unfortunately, many manufacturers have existing business relationships that make this infeasible. For example, a manufacturer may have a longstanding business relationship a large retail distributor, against whom this direct-sale merchandising would compete. Thus such manufacturers have business reasons to refrain from using their web sites for direct sales to consumers.

Some manufacturers have addressed this problem by placing hyperlinks within their web sites to the web site of a retail merchandiser who can sell the product directly to the consumer. When the consumer identifies a product of interest on the manufacturer's site, he or she can click on a hyperlink and be taken to a retailer's site. In this regard, a user selected shopping cart may be delivered from the manufacturer's site to the retailer's site. However, such a hyperlink typically places the consumer into the shopping area of the retail web site, where the consumer may (a) become distracted and thus fail to purchase the product or (b) engage in comparative shopping and possibly purchase a competing product. Clearly, both of these alternatives can result in lost sales for the manufacturer.

The present invention addresses the foregoing through a business method employing computer network technology that allows the customer to "shop" for products at the manufacturer's web site by selecting products of interest and placing them into an electronic shopping cart. Then, instead of proceeding to a checkout line at the manufacturer's site, the system software transfers the customer directly to the checkout line of a retail site of the customer's choosing. (The checkout line of a retail site is that part of the retail site that is brought up when the customer presses a BUY, PURCHASE, or similar button when navigating the retail site.) The entire context of the transaction is also transferred to the retail site. Thus the contents of the shopping cart that was filled at the manufacturer's site are automatically transferred to a shopping cart at the retailer's checkout line. Because the consumer is transferred directly to the checkout line of the retail site, there is less likelihood the customer will be distracted or presented with other shopping alternatives. Since the system saves the state of the shopping cart as the customer jumps from manufacturer's site to retailer's site, the consumer does not need to repeat the shopping selection process at the retailer's site and the manufacturer is relieved from handling the payment and shipping transaction directly with the consumer.

The invention encompasses a new method for conducting electronic commerce in which manufacturing and retailing entities cooperate to give the consumer a seamless web-shopping experience, without the clutter and distraction of having to navigate through multiple web sites on the manufacturer and retailer's respective sites. This business method can be implemented using a variety of different interactive web-based technologies. For a more complete understanding of the invention, its objects and advantages, refer to the following specification and to the accompanying drawings.

DESCRIPTION OF THE PREFERRED EMBODIMENTS

Figure 1:
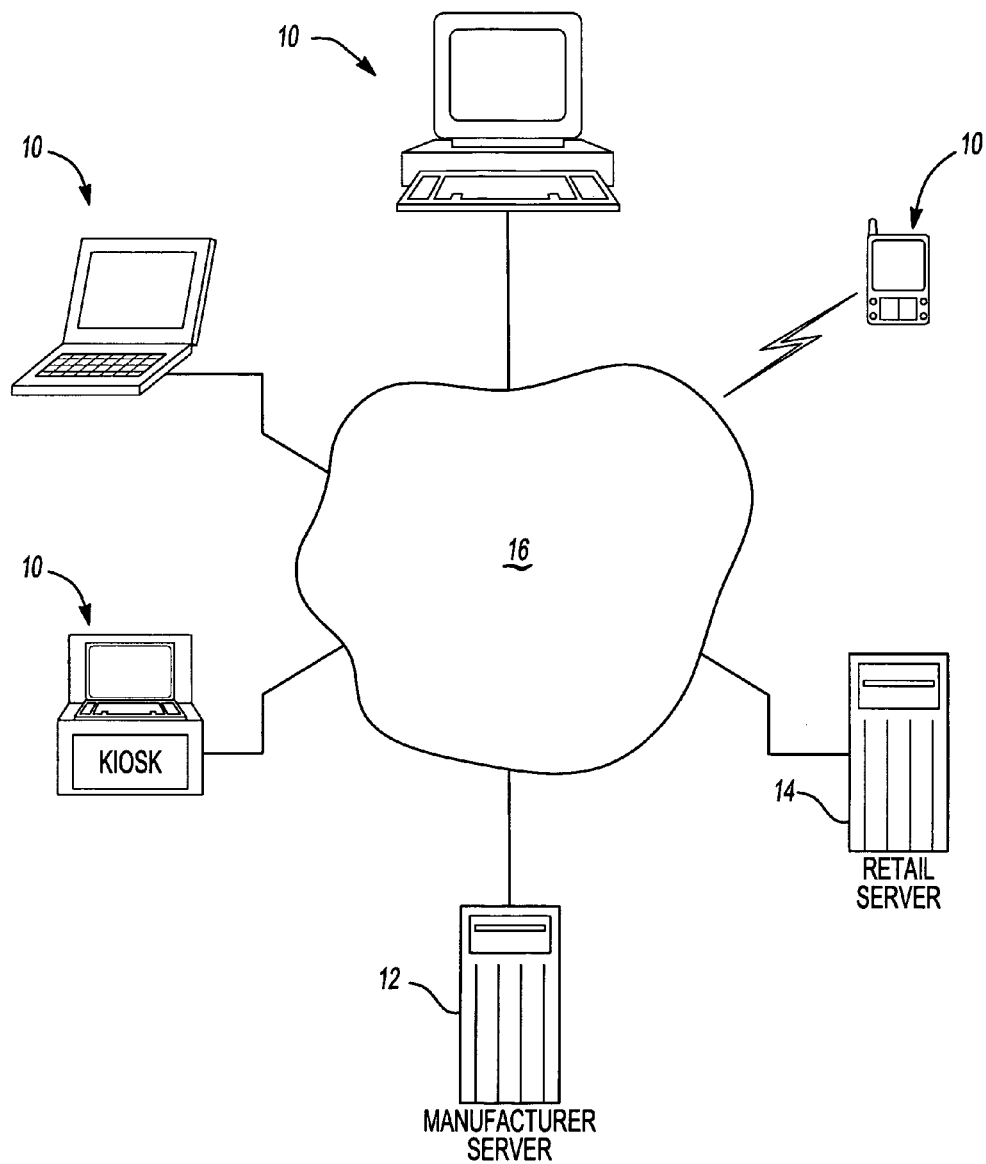
FIG. 1 is a network system diagram illustrating the computer network infrastructure over which the invention may be practiced.

The electronic commerce system and method of the present invention is preferably implemented in a computer networked environment, such as the Internet. Accordingly, FIG. 1 shows an exemplary network topology in which a plurality of customers using personal computers or laptop computers 10 interact with the respective web servers of the manufacturer 12 and the retailer 14. Communication is effected over a computer network such as the Internet 16. In this regard, it will be recognized that the network over which the various participants communicate can take any physical form. The current Internet infrastructure uses a combination of different physical media including cable, copper wire, satellite link, fiber optic cable, and the like. Moreover, while computer terminals have been illustrated at the customer locations, it will be recognized that other types of access devices may be used, such as suitably equipped web-enabled televisions, handheld portable digital assistance (PDA's) Internet appliances, public kiosks, and the like.

Figure 2:
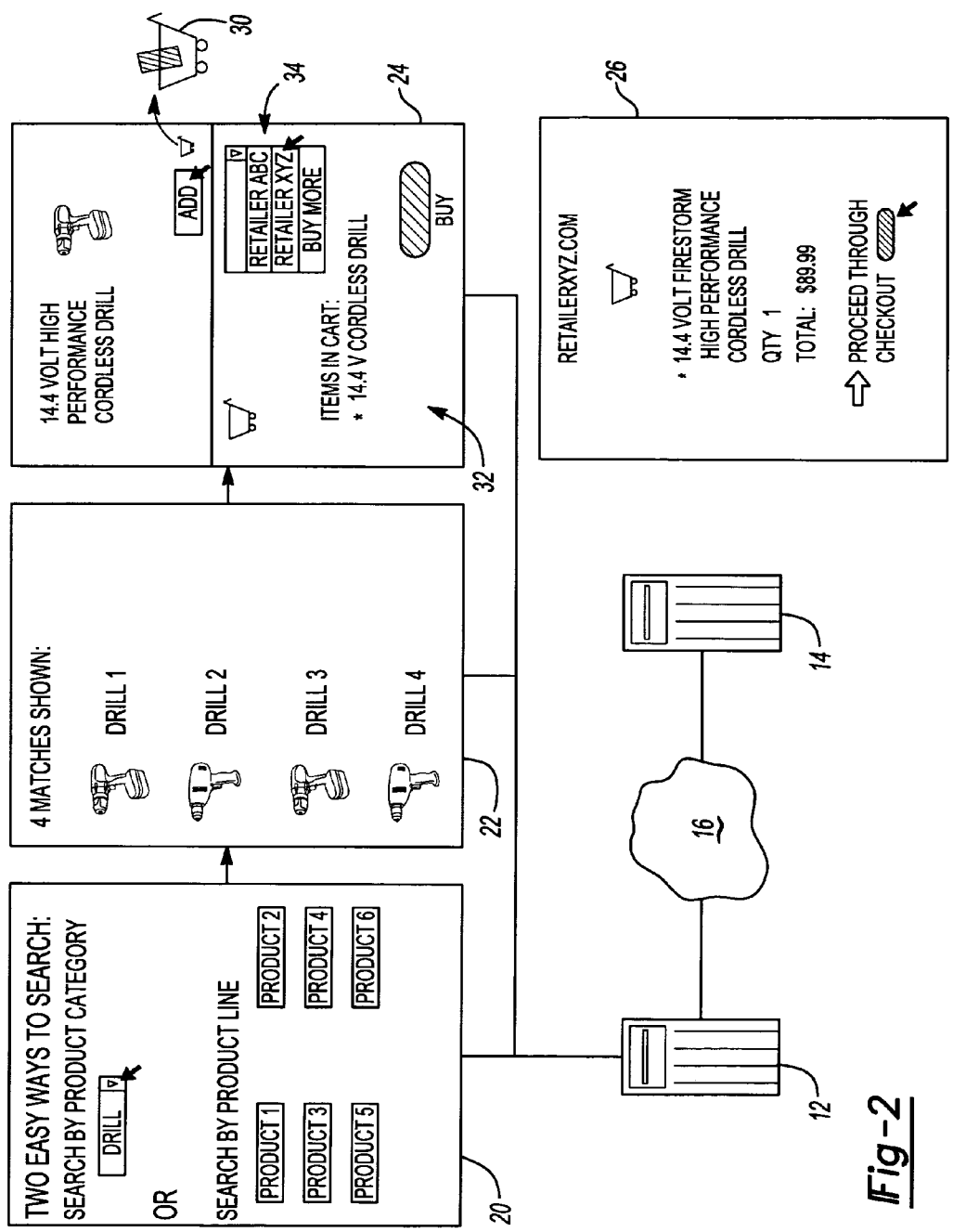
FIG. 2 is a collection of storyboard diagrams illustrating the principles of the invention from a customer's perspective.

Referring now to FIG. 2, an overview of the inventive system and method will be given. FIG. 2 shows a series of web screens as they might appear in the customer's web browser. As illustrated, the first three screens 20, 22 and 24 are served by the manufacturer's web server 12. The remaining screen 26 is served by the retailer's web server 14. The appearance of the web pages in this series of screens is intended to be exemplary. There are, of course, many other ways to design web page layouts to capture the relevant information used by the system. In web page 20 the customer has selected a product category from the manufacturer's web site, in this case Drills-Cordless. Selecting this category takes the customer to web page 22 where a list of cordless drills are offered. In this case, the customer selects a 14.4 V cordless drill. This selection takes the customer to page 24 where the details of the 14.4 V drill are described. If the customer wishes to purchase the identified drill he or she can add the product to an electronic shopping cart 30 that is administered by the manufacturer's server 12. The shopping cart is preferably implemented using cookie technology that will be described more fully below. Essentially, the selected product is placed into a data structure that is then shipped to the customer's web browser site in the form of a cookie that is then stored by the customer's browser.

After having made the product selection, the customer can continue shopping on the manufacturer's site by using suitable browser navigation buttons to backtrack or jump to the product search page 20. When the customer is finished shopping and ready to purchase the products in shopping cart 30, he or she navigates to the checkout screen by selecting an appropriate navigation button. For illustration purposes, the checkout screen depicted in FIG. 2 comprises the lower frame region 32 of page 24. Of course, if desired, a separate page could be devoted to the checkout function.

The checkout frame 32 lists all of the products in the customer's shopping cart. In this case, one product is listed: 14.4 V Cordless Drill. The customer selects from a drop-down menu box, or other suitable data entry means, the name of a retailer through which the products will be purchased. In this case, the customer has selected Retailer XYZ. The customer then selects the BUY button, which causes a packet of information to be assembled, containing the customer's identification information and the product identification information. Depending on the requirements of the retailer's site, the customer information may include such information as the customer's name, address, shipping information, credit card information, and the like. The product information may include the manufacturer's product number, or the product number used by the particular retailer selected. The packet of information is then sent directly to the site of Retailer XYZ and the customer then automatically receives web page 26 corresponding to Retailer XYZ's electronic checkout line. Note that the customer has jumped directly into the checkout line of the selected retailer. Thus use of the "Back" navigation button on the customer's web browser would take the customer back to the manufacturer's site and not to any other page within the retailer's site. Now in the checkout line, all the customer must do is to proceed through checkout by clicking the appropriate button(s) on the retailer's site. If all pertinent shipping and billing information was obtained via the manufacturer's site, then the checkout process can be completed by a suitable button selection. If additional information is needed, it may be collected through the standard features of the retailer's checkout line, These features typically give the customer the option of selecting a particular shipping method, selecting a particular payment method, indicating whether the product should be gift-wrapped or delivered with special instructions, and the like.

Figure 3:
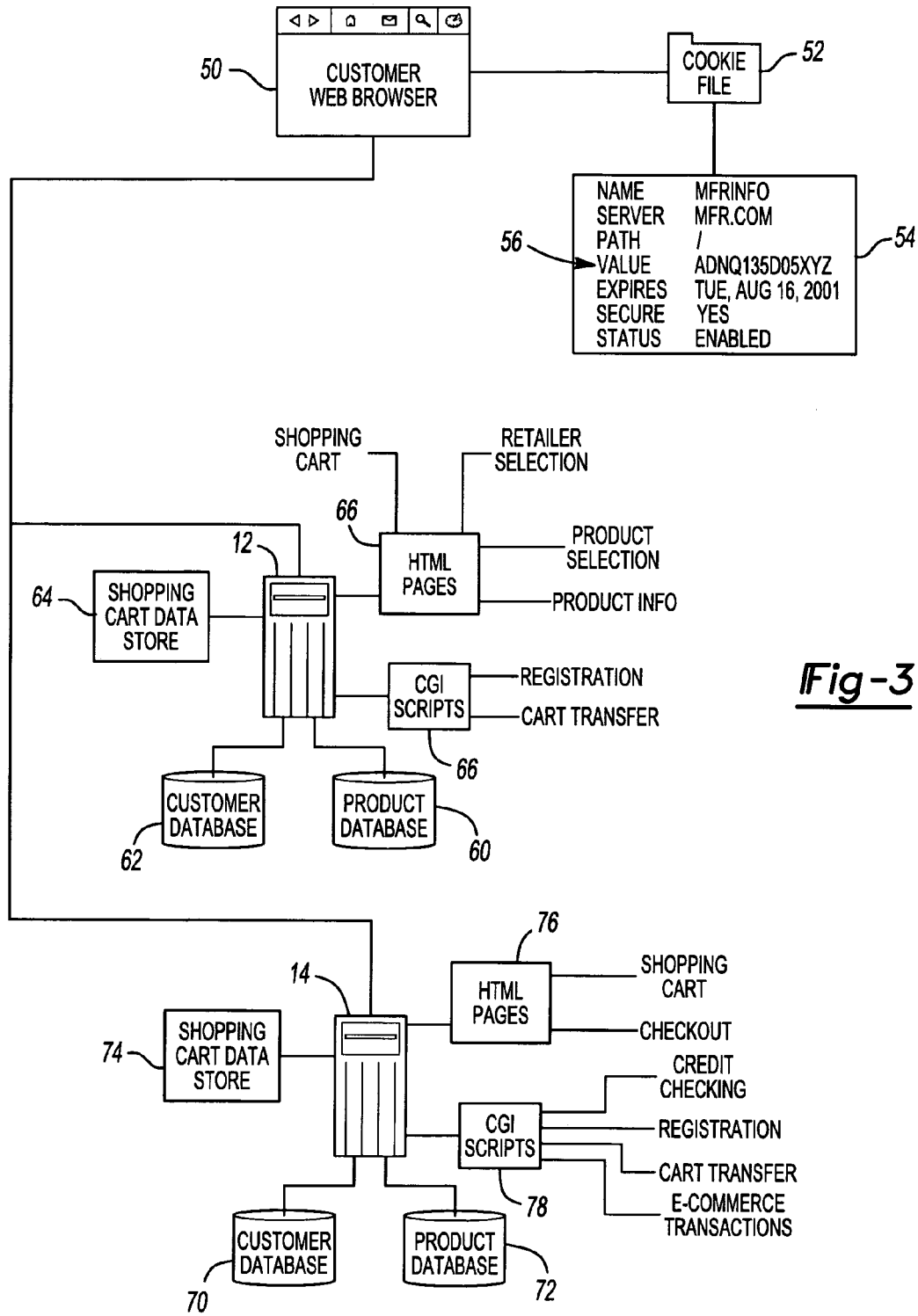
FIG. 3 is a block diagram of one presently preferred embodiment for implementing the commerce system.

The system may be implemented as illustrated in FIG. 3 to allow customers to access both the manufacturer's web server 12 and the retailer's web server 14 through a suitable web browser 50. An embodiment uses cookie technology for maintaining the state of transactions as the customer is transported from the manufacturer's site to the checkout line of the retail site. The customer's web browser maintains a cookie file 52 containing cookie data corresponding to those sites that the customer has visited and accepted cookies from. The cookie data typically includes information of the type illustrated in data structure 54. This data includes the name or other identifier of the cookie, the server from which the cookie was obtained and other path information. The cookie data also typically includes additional housekeeping information such as the expiration date of the cookie, whether the cookie employs secure technology or not and whether the cookie has been enabled for use or not. At the heart of the cookie data is the cookie value, shown at 56. The value is encoded information about the state being saved by the cookie. Thus the encoded value would store, for example, the product identification information of a product selected by the customer, the customer's identification information (e.g., name, address). Although the value information might appear unintelligible when displayed as alpha numeric text, the data is meaningful to the host site that supplied the cookie.

The manufacturers web server 12 includes a product data base 60, containing the pertinent descriptive information and product ID designations for all products offered by the manufacturer. Although not required in all implementations, the manufacturer's site can also include a customer data base 62 that is used to store customer information for market research purposes and for supplying customer identification information to the selected retailer site. In addition, the manufacturer's server includes a shopping cart data store 64 that is used in processing cookies sent to and received from customer sites.

The manufacturer's site may be implemented using HTML, XML and other Internet web page technologies. HTML pages have been illustrated here at 66. These pages would include suitable pages for product selection, product information, retailer selection and shopping cart functions. Examples of such pages were illustrated in FIG. 2 at 20, 22 and 24. The server 12 also includes a collection of CGI scripts or other processing routines for handling the interaction between the customer's web browser and the data bases and the data stores maintained by the server. These scripts are illustrated diagrammatically at 66. They perform the common gateway interface (CGI) functions by which web browsers such as Netscape or Internet Explorer communicate with the server. The CGI scripts may be written in Pearl, C, C++, tcl, Visual Basic, AppleScript, JavaScript, Java and the like. The choice of programming language is largely a matter of design preference.

The retailer's web server 14 is implemented in a similar fashion. The retailer's site includes a customer data base 70 and product data base 72 as well as a shopping cart data store 74. The retailer's site also employs a collection of web pages, such as HTML pages 76 and associated CGI scripts 78. The HTML pages and CGI scripts are designed to provide the functionality needed to implement the entire retailer's site. In FIG. 3, only those functions specifically utilized by the present invention have been illustrated. Thus the retailer's site includes HTML pages to implement its shopping cart and its checkout function. The CGI scripts include customer registration, credit checking, E-commerce transactions, and the like.

As noted above, the electronic commerce checkout system of the invention transfers the contents of the shopping cart at the manufacturer's site to the shopping cart at the retailer's site. This may be implemented using cart transfer CGI scripts at both the manufacturer's site and the retailer's site. The cart transfer script at the manufacturer's site compiles a package of information in a predefined format that is known to the cart transfer script at the retailer's site. The information package will include suitable product description information, allowing the retailer's site to identify the selected product from its product data base 72. If the manufacturer's site is also sending the retailer's site information about the customer, such as the customer's name, mailing address and credit card information, that information may also be packaged as part of the cart transfer script information. Depending on the design of the respective web sites, the information package transferred by the cart transfer script can be delivered in the form of a cookie passed through the customer's web browser, or through other suitable data transfer means. For example, the GET or POST methods may be used to send information to the retailer's server.

Figure 4:
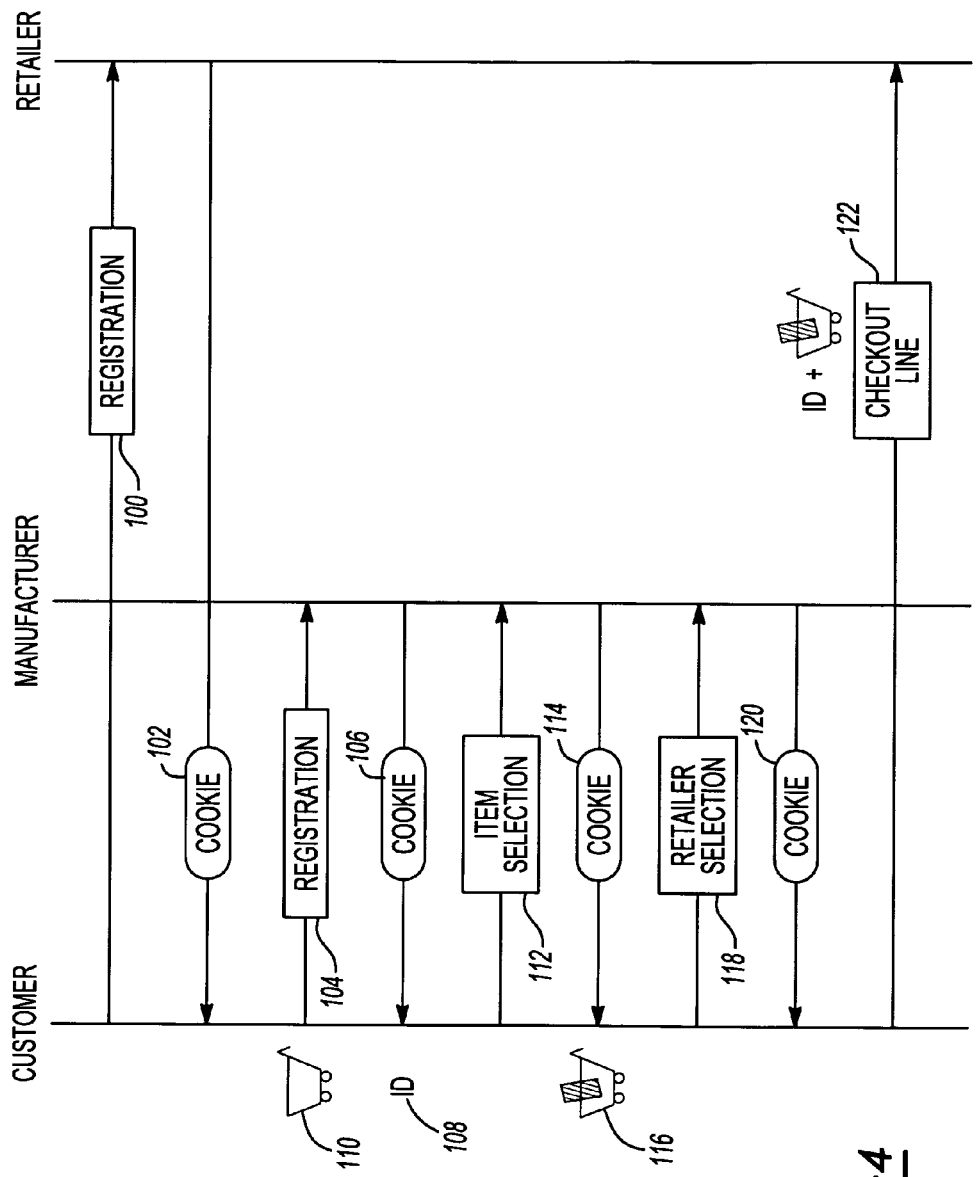
FIG. 4 is an event diagram of an embodiment illustrating how the components of FIG. 3 interact to perform the inventive method.

The electronic commerce checkout system passes information back and forth among the customer, manufacturer and retailer computers. FIG. 4 illustrates how the information exchange may take place. FIG. 4 is an event diagram in which the exchange of data and information is represented by horizontal arrows and in which time flows from top to bottom. Each of the customer, manufacturer and retailer entities has its own vertical time line. The procedure begins with a customer registration process. In order for the customer to place an order through a given retailer, the customer needs to provide that retailer with the necessary identifying information, including the customer's name, billing address, shipping address, payment method, and the like. The customer can register with a retailer before visiting the manufacturer's site, or during the checkout process. FIG. 4 illustrates how registration would be effected at the retailer's site prior to using the manufacturer's site for product selection. Thus the customer interacts with the retailer's site by providing registration information 100. This information is typically captured through one or more web pages that are sent from the retailer site to the customer's browser. After receiving the registration information, the retailer sends back a cookie 102 which is stored by the customer's browser. As discussed above, the cookie contains information that the retailer's site will need later. Cookie technology is used so that the pertinent information for a particular customer is stored by the customer's browser instead of at the retailer's site.

Depending on the configuration of the electronic commerce checkout system, the customer may also register with the manufacturer's site in a similar fashion. The manufacturer's site would provide the customer's web browser with suitable pages in which the pertinent registration information is gathered and sent to the manufacturer's site as illustrated at 104. The manufacturer's site then returns cookie 106. Thus, now the customer's browser has identification data (ID 108) suitable for identifying that customer with the manufacturer's site. Associated with that customer is an electronic shopping cart 110 posted by the manufacturer's site. At this point in the illustration, the shopping cart 110 is empty, because the customer has just registered with the manufacturer's site and has not yet selected any products for placement in the shopping cart.

Next, the customer interacts with the manufacturer's site to perform product selection as illustrated at 112. Product selection may be effected through a series of web pages, such as those illustrated at 20, 22 and 24 in FIG. 2. When the customer selects a product, the manufacturer's site updates the cookie associated with the manufacturer's site as illustrated at 114. Thus the shopping cart administered by the manufacturer's site will now have the selected product in it as illustrated at 116. Once all products have been selected at the manufacturer's site, the customer interacts with the manufacturer's site to select the desired retailer.

The retailer selection process may be effected through suitable data input mechanism such as the drop-down selection box 34 (FIG. 2). The manufacturer's site may respond directly to the retailer selection process 118 by transmitting the pertinent customer information and product information to the retailer of choice. However, to give the customer the opportunity to change his or her mind about the selected retailer prior to checkout, the illustrated embodiment does not jump directly to the retailer after retailer selection. Rather, the manufacturer's site updates its cookie as at 120, so that the customer's web browser now contains a cookie of information containing the customer's identification information (if any), the product information and the desired retailer designation. When the customer ultimately decides to purchase the selected products (pressing the BUY button in page 24 of FIG. 2) the customer's web browser contacts the retailer's site to request the retailer's site to send the checkout line web page. The information previously stored in the manufacturer's cookie is then used to inject the desired products and other pertinent information such as the customer's identification information (if any) into the checkout line 122 of the retailer's site. In this way, the customer finds himself or herself in the checkout line of the retailer's site with the retailer's site shopping cart full of all products selected at the manufacturer's site. The customer can then proceed through the checkout line to effect payment and provide the desired shipping instructions.

Figure 5:
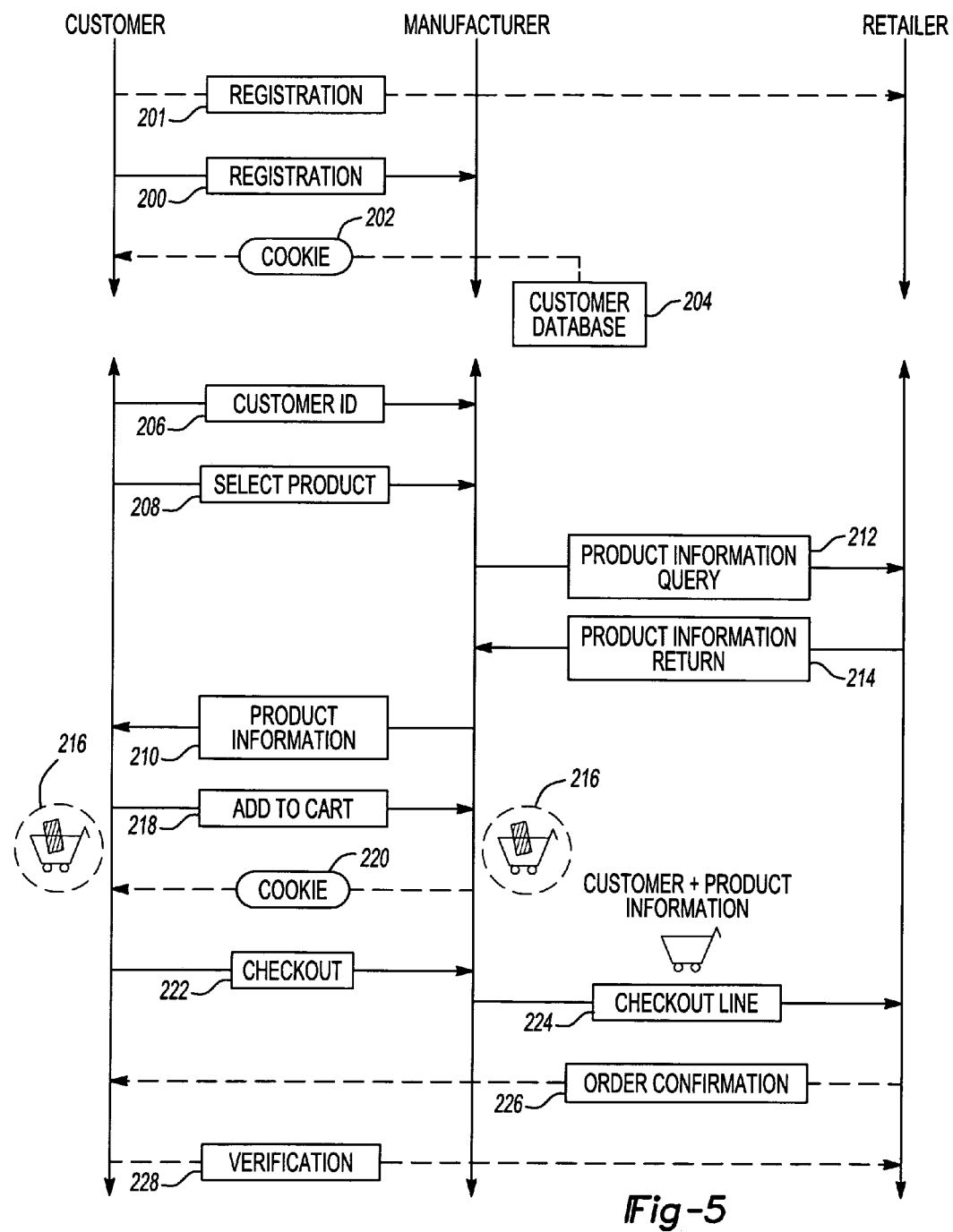
FIG. 5 is an event diagram of an alternative embodiment of the invention.

FIG. 5 shows a variation of the information exchange of FIG. 4. The information exchange begins at 200 when the customer registers with the manufacturer's site, such as in the manner discussed with reference to FIG. 4. During the registration process, the manufacturer's site requests that the customer enter key personal information, including customer transaction information. As used herein, customer transaction information is information about the customer that a retailer would need to complete a purchase transaction with the customer. The customer transaction information would illustratively include the customer's name, address, shipping information, payment information (e.g, credit card number, electronic wallet or other payment service, or the like). The customer registration information would also illustratively include the customer's fulfillment partner(s) preference (e.g., retailer(s)). The manufacturer's site then either sends a cookie 202 to the customer's browser, as described with reference to FIG. 4, stores the registration in a customer database 204 for use in a customer login process, or uses a combination of the two. For example, the login process might be used to verify that the customer registered and store non-sensitive information about the customer while the cookie is used to store sensitive information about the customer so that the sensitive information is stored by the customer's browser and not in the customer database. The customer can then continue browsing the manufacturer's site or exit the manufacturer's site and return to it later. The customer may optionally register at 201 with the retailer's site. If the customer has not registered with the retailer's site when the customer is taken to the retailer's electronic checkout line, as discussed below, the customer registration information obtained during the customer's registration 200 with the manufacturer's site may optionally be used to register the customer with the retailer.

If the customer exits the manufacturer's site and returns to it later, then the customer identity 206 is provided to the manufacturer's site. If a cookie had been returned to the customer's browser with the customer's registration information when the customer registered, then the customer identity is provided from this cookie. If the customer's registration information was stored in customer database 204, then the customer is presented with a logon screen and logs into the manufacturer's site using known logon techniques, such as entering a name and password. If the customer continued browsing the manufacturer's site after registering, then the customer identification 206 need not be provided to the manufacturer's site as it would be retained from the registration process.

The customer next selects an product that the customer may be interested in purchasing at 208. The manufacturer's site then returns product information 210 to the customer, such as specifications for the product and a product identification, such as a catalog number. Optionally, there may be an automated information exchange between the manufacturer's site and the preferred fulfillment partner's (retailer's) site where the manufacturer's site requests retail specific product information 212 which the retailer's site returns to the manufacturer's site at 214. Retail specific product information as used herein means information about the product that is specific to each retailer regarding the terms on which the retailer will sell the product, such as price, availability, delivery, shipping charges, and the like. The product information returned from the retailer's site is then included in the product information 210 that the manufacturer's site returns to the customer. In a variation of the above, the manufacturer's site can return product information 210 prior to the information exchange between the manufacturer's site and the retailer's site with that information exchange taking place if the customer then requests retail specific product information, with this information then being returned to the customer from the retailer's site.

If the customer decides to purchase the product, the customer adds it to electronic shopping cart 216 at 218. Electronic shopping cart 216 is maintained either on the customer's browser or the manufacturer's site. If electronic shopping cart 216 is maintained on the customer's browser, the manufacturer's site sends a cookie 220 with the appropriate product information to the customer or updates the cookie the manufacturer's site established during the registration process with the appropriate product information. If electronic shopping cart 216 is maintained on the manufacturer's site, the manufacturer's site stores the appropriate product information. It should be understood that the manufacturer's site may store the product information in any event in order to track products that customers have expressed interest in purchasing by adding them to their carts 216 during a browsing session, as well as tracking products that customers purchase by proceeding to complete the retailer's checkout process.

The customer may then continue browsing the manufacturer's site and add other products to its electronic shopping cart 216, or proceed to checkout at 222, such as by clicking a checkout button on the manufacturer's site. At checkout, the manufacturer's site sends the pertinent customer and product information, such as customer identification, shipment, payment and product catalog information, to the retailer's checkout line 224, preferably in a secure, encrypted form. XML is preferably used. Alternatively, particularly if electronic shopping cart 216 is maintained on the customer's browser, the electronic shopping cart 216 cookie created by the manufacturer's site is used to inject the pertinent information into the retailer's checkout line 224 as described above with reference to FIG. 4. Optionally, the retailer's site then returns order confirmation 226 to the customer and the customer confirms the purchase by sending verification 228 to the retailer's site.

In another alternative, when the customer proceeds to checkout at 222, the pertinent customer and product information is stored in a manner that the customer can access it when the customer's browser is transferred to the retailer's site electronic checkout line. This is illustratively accomplished by the information being copied by the manufacturer's site into a pop-up window, a clipboard such as provided in the Microsoft Internet Explorer browser, or in a browser window. The customer's browser is then taken to the retailer's site and its electronic checkout line 224. The customer then inputs the pertinent customer and product information into the retailer's checkout line 224 manually. In doing so, the customer can access and use the stored product and customer information. Illustratively, the customer can refer to the pop-up window, clipboard (in which case the pertinent information would have been stored in a notepad document) or browser window, or can copy or cut and paste the pertinent customer and product information from the pop-up window, clipboard, or browser window into the retailer's checkout line 224. While this alternative is more of a manual process requiring customer action than the previously described processes which are transparent to the customer, it has the advantage of simplicity in terms of interconnecting with the retailer's site in that the customer need only be taken to the retailer's site and its checkout line 224 via a conventional hyperlink.

Figure 6:
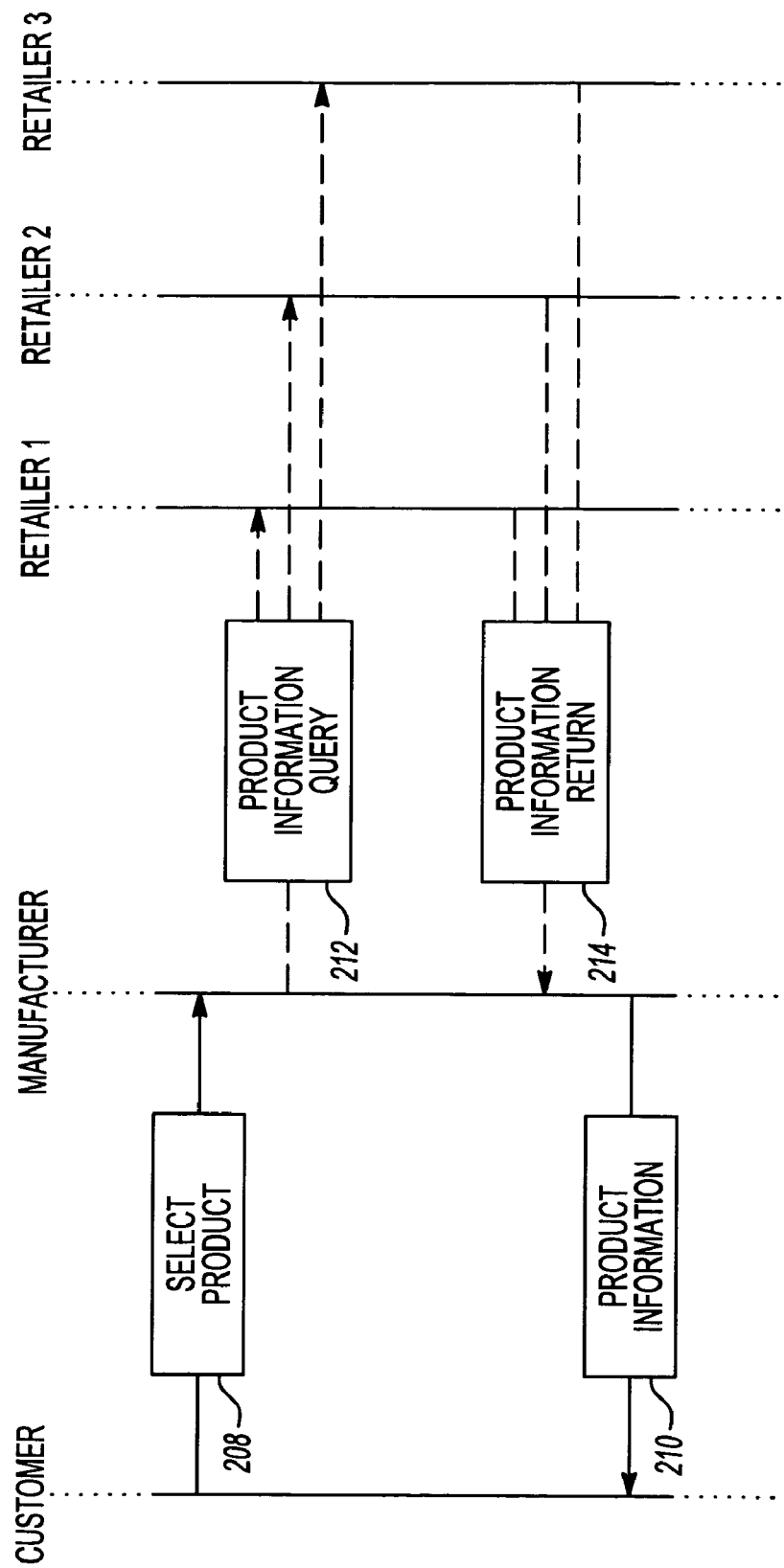
FIG. 6 is an event diagram showing a variation of the embodiment of FIG. 5.

With reference to FIG. 6, a variation of the information exchange described with reference to FIG. 5 is shown. When the manufacturer's site engages in the automatic product information exchange with the retailer's site, it does so with multiple retailers' sites, representatively shown as Retailer 1, Retailer 2 and Retailer 3 in FIG. 6. Each of the retailer's sites returns product information at 214 which is then presented to the customer as discussed above. The customer, upon deciding to purchase the product, also selects the retailer from whom to purchase it. The retailers with which the manufacturer's site engages in the automatic product information exchange may be selected by the customer during the registration process, may be selected by the customer during the browsing session, or may be all the retailers who sell the product selected by the customer. If the customer selects the retailers during registration, information identifying those retailer's sites is stored as part of the customer registration information. The product information returned by each of the retailer sites is sorted by predetermined criteria, such as price, by either the customer's browser or the manufacturer's site. This predetermined criteria is illustratively selected by the customer during registration 200 and stored either as part of cookie 202 or in customer database 204.

Figure 7:
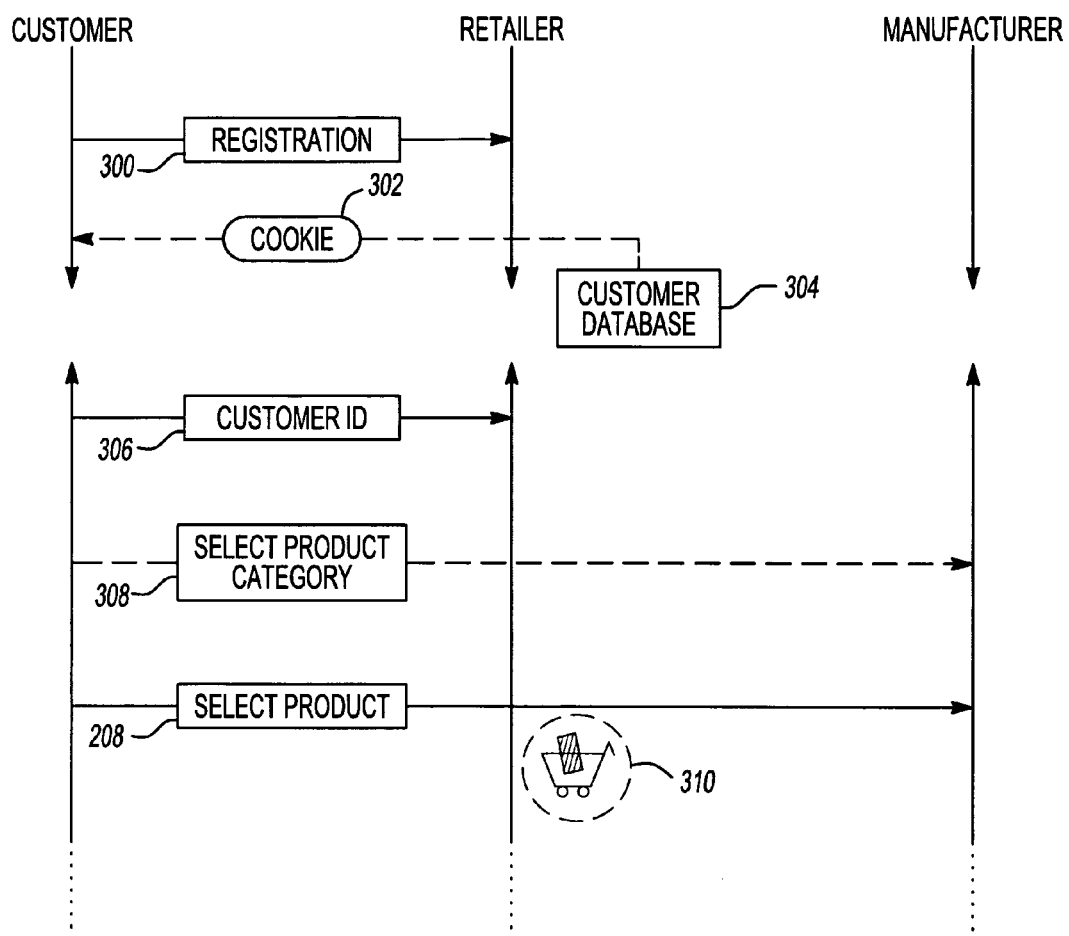
FIG. 7 is an event diagram showing an alternative embodiment of the invention.

Referring to FIG. 7, an illustrative information exchange for a process that is the "reverse" of the above described processes is shown. The customer registers at the retailers site at 300, in the same manner as has been described above with regard to the customer registering at the manufacturer's site. Additional information that is obtained from the customer during registration is the customer's preference for a certain manufacturer's brand of product, such as the customer's brand preference for a particular product category, cordless drills for example. The registration information is then sent to the customer's browser via a cookie 302, stored in a customer database 304, or both. The customer can then continue browsing the retailer's site or exit it and return later.

If the customer exits the retailer's site and returns to it later, then the customer identity 306 is provided to the retailer's site. If the retailer's site had returned a cookie to the customer's browser with the customer's registration information, the customer identification is obtained from this cookie. Otherwise, the customer is taken through a logon process. If the customer continued browsing the retailer's site after registering, then the customer identification 306 need not be provided to the retailer's site as it would be retained from the registration process.

Upon the customer navigating to the page(s) on the retailer's site for a product category for which the customer expressed a manufacturer brand preference during registration, the customer is transferred to the manufacturer's site, preferably, to the pages on the manufacturer's site for the products in the product category selected by the customer. Alternatively, if the customer has not selected a brand preference during registration, the retailer's site serves a page to the customer's browser (or has a field on a page served to the customer's browser) where the customer can enter the customer's brand preference. Upon selection of a brand preference at 308, the customer is taken to the manufacturer's site for that brand in the manner described above and the customer's registration information may illustratively be updated to include the customer's brand preference. The process can then continue in the manner described with reference to FIG. 5 from the select product 208 step. The customer obtains as much product information from the manufacturer's site as needed for the purchasing decision, adds one or more products to the electronic shopping cart and returns to the retailer's site where the purchasing transaction is completed. In this regard, the manufacturer's site may store the product information for a product selected by the customer so that it can be accessed by the customer when the customer's browser returns to the retailer's site, such as in the manner discussed above. Alternatively, the retailer's site may maintain an electronic shopping cart 310 for the customer. When the customer adds a product to electronic shopping cart 320 at step 218 (FIG. 5), the product information from the manufacturer's site may immediately be sent to the electronic shopping cart 310 maintained at the retailer's site where it would illustratively be coupled with associated product information from the retailer's site. In either event, the customer's browser is preferably returned to the electronic checkout line of the retailer's site.

From the foregoing it will be seen that the present invention gives manufacturer's the ability to participate in Internet-based electronic commerce in a co-operative manner with its retailers. The system and method thereby protects valuable business relationships between the manufacturer and the retailer, and relieves the manufacturer of the need to process the retail transaction with the customer. The system further benefits the manufacturer by helping increase the likelihood that products selected at its web site are not abandoned in an unfulfilled shopping cart when the customer jumps to the retail site to make a purchase. The system also reduces the likelihood that a customer will make a comparative shopping decision and purchase a competing product after the initial product has been selected from the manufacturer's web site.

While the invention has been described in its presently preferred embodiments, it will be understood that the invention is capable of modification without departing from the spirit of the invention as set forth in the appended claims.

What is claimed is:

1. A method of transacting electronic commerce, comprising:
   from a first entity site, serving a product selection page by which a customer through a browser selects at least one product for placement into an electronic shopping cart; and
   from the first entity site, serving electronic shopping cart transfer instructions to the customer browser that causes the customer browser to request service from a checkout line of a second entity site that automatically transfers the contents of the electronic shopping cart to the checkout line of the second entity site that conducts checkout processing of the at least one product.

2. The method of claim 1, wherein the placement of each product in the electronic shopping cart includes the first entity site sending a cookie to the customer browser having product information about each product.

3. The method of claim 2, wherein the step of automatically transferring the contents of the electronic shopping cart to the checkout line of the second entity site includes transferring information in the cookie to the checkout line of the second entity site.

4. The method of claim 1 and further including, from the first entity site, serving a customer registration page by which the customer registers with the first entity site and provides customer registration information to the first entity site, the customer registration information including information uniquely identifying the customer that is transferred to the checkout line of the second entity site when the contents of the electronic shopping cart are transferred to the checkout line.

5. The method of claim 4, wherein the first entity site sends a cookie to the customer's browser containing the customer registration information, the customer registration information in the cookie being transferred to the electronic checkout line of the second entity site when the contents of the electronic shopping cart are transferred to the electronic checkout line of the second entity site.

6. The method of claim 4 wherein the first entity site stores the customer registration information in a customer database, the customer logging into the first entity site and the customer registration information for that customer stored in the customer database uniquely identifying that customer.

7. The method of claim 1 wherein the customer registration information includes information specifying the second entity site.

8. The method of claim 1 wherein the first entity site requests product information about the at least one product from the second entity site, the requested product information from the second entity site being returned to the customer browser.

9. The method of claim 8, wherein the first entity site requests product information from the second entity site by serving instructions to the customer browser that causes the customer browser to request the product information from the second entity site.

10. The method of claim 8 wherein the requested product information from the second entity site is stored in the electronic shopping cart.

11. The method of claim 8 wherein the product information requested from the second entity site includes retail specific product information.

12. The method of claim 11, wherein the retail specific product information includes any of price, delivery, availability, shipping weight, and shipping charges.

13. The method of claim 8 wherein the first entity site requests the product information about the least one product from a plurality of second entity sites.

14. The method of claim 13 wherein the customer registration information includes information identifying the plurality of second entity sites which is used by the first entity site to identify the plurality of second entity sites from which to request the product information.

15. The method of claim 13 wherein the product information requested by the first entity site from each of the plurality of second entity sites comprises retail specific product information.

16. The method of claim 13 wherein the customer browser sorts the product information returned from each of the plurality of second entity sites based on predetermined criteria.

17. The method of claim 4 wherein the customer registration information includes customer transaction information, the customer transaction information being transferred to the electronic checkout line of the second entity site when the contents of the electronic shopping cart are transferred to the electronic checkout line of the second entity site.

18. The method of claim 17 wherein the customer transaction information includes any of credit card number information, electronic wallet information, and payment service information.

* * * * *